J. S. ROWLAND.
Wagon Jacks.
No. 152,173.
Patented June 16, 1874.
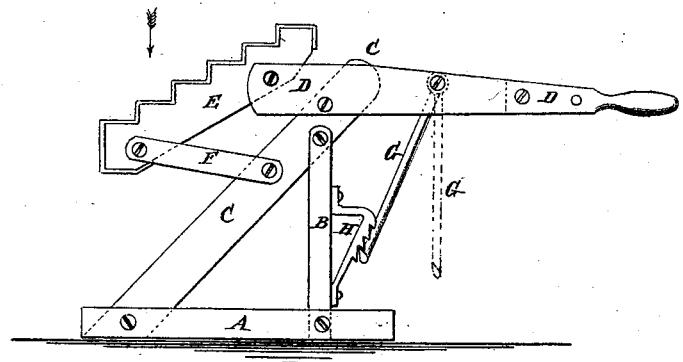

UNITED STATES PATENT OFFICE.

JAMES S. ROWLAND, OF SENECAVILLE, OHIO.

IMPROVEMENT IN WAGON-JACKS.

Specification forming part of Letters Patent No. 152,173, dated June 16, 1874; application filed May 1, 1874.

*To all whom it may concern:*

Be it known that I, JAMES S. ROWLAND, of Senecaville, in the county of Guernsey and State of Ohio, have invented a new and useful Improvement in Wagon-Jack, of which the following is a specification:

The figure is a side view of my improved lifting-jack.

Similar letters of reference indicate corresponding parts.

My invention has for its object to furnish an improved wagon or lifting jack, simple in construction, inexpensive in manufacture, convenient in use, and effective in operation, being equally applicable to all kinds of wagons and carriages. The invention consists in an improved wagon-jack, formed of the base, the vertical standard, the inclined standard, the pivoted lever, the pivoted and inclined notched bar, the pivoted connecting-bars, the pivoted hook, and the ratchet-bar, constructed and arranged to operate in connection with each other as hereinafter fully described.

A is the base of the jack, which is made of such length and breadth as to furnish a firm and stable support to the jack. To the base A, near its rear end, is attached the lower end of an upright, B, to the upper end of which is attached an inclined bar, c, the lower end of which is attached to the forward end of the base A. The upper end of the inclined standard C projects above the upper end of the vertical standard B, and to it is pivoted a lever, D. The forward end of the lever D projects, and to it is pivoted the upper part of the inclined bar E, to the lower end of which are pivoted the forward ends of the connecting-bars F, the rear ends of which are pivoted to the inclined bar c, so that when the lever D is operated both ends of the inclined bar E may be raised equally. The forward side of the inclined bar E has a series of notches formed on it to receive the axle of the wagon. G is a rod, the upper end of which is pivoted to the lever D, and its lower end has a hook formed upon it to catch upon the teeth of the ratchet-bar H, attached to the rear side of the standard B, to hold the load securely when raised.

In using the jack the free end of the lever D is raised, and the jack is moved forward until the axle rests in one of the notches of the bar E. The lever D is then lowered until the load has been raised to the desired height. The hook G is then swung forward until it catches upon one of the teeth of the ratchet-bar H, which holds the load suspended. To lower the load the lever D is lowered slightly, which allows the hook G to drop away from the ratchet H, when the load can be easily lowered.

Having thus described my invention, I claim as new, and desire to secure by Letters Patent—

A wagon-jack formed of the base A, the vertical standard B, the inclined standard C, the pivoted lever D, the pivoted and inclined notched bar E, the pivoted connecting-bars F, the pivoted hook G, and the ratchet-bar H, constructed and combined substantially as herein shown and described.

JAMES S. ROWLAND.

Witnesses:
EDWARD S. DOLLISON,
WILLIAM E. ROWLAND.